United States Patent [19]

Burba et al.

[11] 4,268,548

[45] May 19, 1981

[54] POLYVINYL CHLORIDE-PLASTISOL HAVING IMPROVED ADHESION

[75] Inventors: Christian Burba, Ascheberg-Herbern; Hans-Günter Volland, Unna; Norbert Esper, Bergkamen, all of Fed. Rep. of Germany

[73] Assignee: Schering Aktiengesellschaft, Berlin and Bergkamen, Fed. Rep. of Germany

[21] Appl. No.: 79,089

[22] Filed: Sep. 26, 1979

[30] Foreign Application Priority Data

Sep. 27, 1978 [DE] Fed. Rep. of Germany ....... 2841923

[51] Int. Cl.³ .............................................. B05D 3/02
[52] U.S. Cl. ................................... 427/387; 260/32.4; 427/388.2; 427/388.5
[58] Field of Search .................. 427/388.2, 388.5, 387; 260/32.4, 31.8

[56] References Cited

U.S. PATENT DOCUMENTS

| | | | |
|---|---|---|---|
| 3,061,467 | 10/1962 | Vincent | 427/388.2 |
| 3,088,847 | 5/1963 | Pines | 427/388.2 |
| 3,513,222 | 5/1970 | Speitel et al. | 427/388.5 |
| 4,151,317 | 4/1979 | Burba et al. | 427/388.5 |

FOREIGN PATENT DOCUMENTS 1113635 5/1968 United Kingdom .

*Primary Examiner*—Ronald H. Smith
*Assistant Examiner*—Janyce A. Bell
*Attorney, Agent, or Firm*—Curtis, Morris & Safford

[57] ABSTRACT

What is disclosed are a method for coating or adhering a substrate material which comprises applying to said substrate material a plastisol composition comprising a polymer of vinyl chloride and then baking the composition onto the substrate material at a temperature between about 100° C. and 200° C., said plastisol composition further comprising from 0.05 to 5 percent, by weight of said plastisol composition, of an adhesion improver which is a compound or compounds having an azomethine group and a silane group and plastisol compositions for practising such a method.

12 Claims, No Drawings

POLYVINYL CHLORIDE-PLASTISOL HAVING IMPROVED ADHESION

The present invention relates to polyvinyl chloride plastisols comprising, as adhesion-improving additives, a Schiff base or azomethine and a silane having functional groups, and to a method for adhering metallic or glass materials, or for the preparation of coatings on metallic or glass materials, with such polyvinyl chloride plastisols.

The resistance of polyvinyl chloride or its copolymers to degradation in the presence of aggressive media has been known for a long time and is widely used to provide corrosion protection for metallic surfaces, for adhering sheet metal constructions, and for sealing welded seams, particularly in the automobile industry.

Such coatings are primarily applied in the form of plasticized vinyl chloride polymers (plastisols) by painting, roller application, or spraying onto the surface of the material to be protected. In a widely-used form, such coating materials (plastisols) comprise a polyvinyl chloride polymer which can be made into a paste and which is particularly characterized by a definite swelling capacity in plasticizers, and further comprise a plasticizer or plasticizer mixture, fillers, stabilizers, and optional coloring pigments and auxiliaries which facilitate the processing of polyvinyl chloride.

The formulation of polyvinyl chloride coating masses which contain plasticizer, their preparation, and the technique of their employment is extensively described in Krekeler Wick, Kunststoff-Handbuch, Vol. II, Part 1, pages 396 et seq. (1963).

It is known in the art that an essential criterion for the value of plastisols applied in such a way is their adhesion to materials coated therewith. This is true above all for coatings on metal parts. A loose adhesion of the protective layer increases the danger of the penetration of aggressive media. Thus, in the case of a coating, water, for example, can easily migrate under the coating and corrode the metal. This would be all the more possible the looser the adhesion of the protective film to the metal.

For increasing the adhesion of these coatings, it has already been proposed in the art to add adhesion-improving additives in the form of organic amine compounds or in the form of esters of acrylic acid or methacrylic acid, or mixtures thereof, to the plasticized polyvinyl chloride. However, both these classes of materials show serious disadvantages.

Organic compounds having free amine groups, such as aliphatic, cycloaliphatic, or aromatic amines to be sure often bring about an improvement in the coating on a metallic substrate when mixed with the polyvinyl chloride. However, as a rule they exhibit high volatility and, as an undesirable side effect, promote a heavy decomposition of polyvinyl chloride when the coating is baked on during the process of application. This effect is made noticeable by a heavy formation of blisters and a brown coloration of the protective film. Condensation products of polymeric fatty acids and polyamines, the so-called polyaminoamides, have proved most advantageous. However, even these still show the undesired effect of decomposition, if only in a weakened form. Further, when amine adhesion improvers are added, the baked-on coating shows only moderate internal strength.

The esters of acrylic acid or methacrylic acid which are used as adhesion improvers, on the other hand, are also not satisfactory since the peroxides necessary to cross-link them and, thus, to make them effective are difficult to manage in practice becasue of insufficient viscosity stability of mixtures containing them. In addition, these additives first show sufficient adhesion improvement only at high concentrations, so that the economy of their use is put into question.

An advance from the point of view of the baking temperature and adhesion on metallic substrates can be attained with certain adhesion improvers, known in the art, which are adducts formed between an isocyanate and certain ketimines. However, adhesion to the so-called "difficult" substrates, for example to aluminum which has not been pre-treated, or to glass, is still not fully satisfactory.

The use of amino alkoxy silanes as adhesion improvers for polyvinyl chloride plastisols used for special utilities is also known in the art. Apart from the fact that the products can only be employed in limited scope for economic reasons, adhesion on the aforementioned "difficult" substrates needs still further improvement.

Thus, the need exists for economical plastisols which permit the formation of highly-strong bonds between the most varied materials, particularly for substrates which are difficult to adhere.

Thus, the present invention has its object the development of adhesion improvers for polyvinyl chloride plastisols which are free of the aforementioned disadvantages and which will show high adhesion of the protective coating, or high bond strength of adhesive bonds, even with difficult substrates such as aluminum which has not been pre-treated and glass.

A feature of the present invention is a method for the preparation of coatings on metallic materials by coating the materials with finely divided polyvinyl chloride or with vinyl chloride copolymers (plastisols which comprise the conventional plasticizers, fillers, additives, and adhesion improvers), followed by burning-on or baking-on the coatings at temperatures between 100° C. and 200° C. wherein the adhesion improver employed is 0.05 to 5 percent, by weight of the plastisol formulation, of at least one compound which contains at least one azomethine group and at least one silane group in the molecule, or of a mixture containing at least one Schiff base and at least one silane.

A further feature of the invention is a plastisol for performing such a process, said plastisol comprising finely divided polyvinyl chloride or a vinyl chloride copolymer, conventional plasticizers, fillers, and additives, and further containing, as an adhesion improver, from 0.05 to 5 percent, by weight of the plastisol formulation, of at least one compound having at least one azomethine and at least one silane group in the molecule, or of a mixture containing at least one Schiff base and at least one silane.

The particular advantages of the plastisols according to the invention are that they can be burned-on or baked-on already at relatively low temperatures, namely between 100° C. and 200° C., in particular between 120° C. and 160° C., and that they give coatings on ordinary metallic materials such as the sheet metal of auto bodies, but also particularly on the aforementioned difficult substrates such as un-pretreated aluminum or glass, which coatings show very good adhesion and do not lead to disturbing color changes, structural deficiencies, and blister formation.

The effect discovered according to the present invention is all the more surprising since neither the Schiff bases nor the mercaptosilane or hydroxysilane compounds of interest to the invention show any adhesion onto the substrates which are difficult to adhere to when they are used alone.

The compounds employed according to the invention which contain at least one azomethine group (Schiff base) and at least one silane group in the molecule are the reaction products of commercial silanes containing amino groups with ketones and/or aldehydes, as well as the reaction products formed between commercial silanes containing reactive groups (for example, particularly the amino group, the mercapto group, or the hydroxy group) and Schiff bases with compounds which react with the reactive groups of both these two components. Instead of reaction products containing azomethine groups and silane groups, corresponding mixtures of azomethine compounds and silane compounds, particularly aminosilanes, can be employed. However, the reaction products are preferred according to the invention, since these all show synergistic effects. If compounds containing azomethine and silane groups are merely mixed, then aminosilanes are preferably used. The mercaptosilanes show no synergistic effects in such mixtures.

The silane component is variable within a relatively wide scope. Commercial silanes having the general formula $X\text{-}C_nH_{2n}\text{-}Si(OR)_3$, are preferred, wherein X is a functional group such as mercapto, hydroxy, or glycidyl, particularly however an amino group, which is bound to the silane group by means of an optionally-substituted hydrocarbon group (wherein n=2-6 carbon atoms), particularly an aliphatic group, which optionally can also contain hetero atoms, and wherein R is a lower alkyl group having from one to six carbon atoms, particularly one to two carbon atoms, which can be partially replaced by hydrogen.

According to the invention, γ-aminopropyl triethoxy silane, γ-glycidyloxypropyl trimethoxy silane, γ-mercaptopropyl trimethoxy silane, N-β-aminoethyl-γ-aminopropyl trimethoxy silane, as well as a commercially-available triamino silane having an amine number of 625 (available under the tradename "Triamino" from Dynamit Nobel) are preferred.

As amines for the preparation of Schiff bases, aliphatic, cycloaliphatic, and araliphatic polyamines having at least two primary amino groups, and which are preferably amino-substituted hydrocarbons, come into consideration, for example: ethylene diamine; propylene diamine; butylene diamine; hexamethylene diamine; 2,2,4(2,4,4)-trimethylhexamethylene diamine; 2,2-dimethyl-1,3-diamino propane; nonamethylene diamine; 3,3'-dimethyl-4,4'-diaminodicyclohexylmethane; diamino-cyclohexane; bis-(1,4-aminomethyl)cyclohexane; 2-aminomethyl-cyclopentylamine; 2,2-bis(4-aminocyclohexyl) propane; and 3-aminomethyl-3,5,5-trimethylcyclohexylamine. For further reaction with diisocyanates such as isocyanatomethyl-3,5,5-trimethyl-cyclohexylisocyanate or pre-adducts thereof containing isocyanate, those Schiff bases are suitable which are prepared from amines, suitably polyalkylene polyamines, such as diethylene triamine, triethylene tetramine, tetraethylene pentamine, tripropylene tetramine, tetrapropylene pentamine, and particularly diethylene triamine, dipropylene triamine, 3-(2-aminoethyl) aminopropylamine, N,N'-bis-(3-aminopropyl)ethylene diamine, as well as higher polyethylene amines or polypropylene amines.

For the preparation of the Schiff bases to be used according to the invention, condensation products, having free amino groups, of polycarboxylic acids with an excess of polyvalent amines—technically designated as polyaminoamides—also come into consideration. Preferred polyaminoamides comprise dimerized higher unsaturated fatty acids and polyalkylene polyamines such as diethylene triamine, triethylene tetramine, dipropylene triamine, etc. The polyaminoamides comprising the dimerized fatty acids, or the polyaminoimidazolines which arise therefrom by the cleavage of a further mol of water, are technically known as hardening agents for epoxy resins (e.g. U.S. Pat. Nos. 2,705,223 and 3,002,941). These polyaminoamides, which may also contain imidazoline groups, preferably have an amine number from about 100 to about 1650. The dimerized fatty acids used in their manufacture are prepared from unsaturated natural and synthetic monobasic aliphatic carboxylic acids having 12-22 carbon atoms, preferably 18 carbon atoms, by polymerization using methods known in the art, e.g. from German Pat. Nos. 1,280,852 and 2,118,702 or the German patent applications laid open under Nos. 1,443,938 and 1,443,968. The dimerized acids comprise unpolymerized monomers and polymers higher than dimers. The composition, in percent by weight, of a typical commercially-available dimerized acid, for example, is:

monomeric acids: 5–5
dimeric acids: 60–80
trimeric and higher polymeric acids: 10–35

The dimer content can be increased by known distillation methods up to 100 percent. The use of hydrogenated fatty acid products is also possible.

Ketones used for Schiff base formation include the aliphatic and cycloaliphatic monoketones, preferably ketones of hydrocarbons: The aldehydes are aliphatic, cycloaliphatic, and aromatic and araliphatic monoaldehydes, preferably derived from hydrocarbons. Acetone, methylethyl ketone, diethyl ketone, methylisobutyl ketone, cyclohexanone, cyclopentanone, diisobutyl ketone, 3,3,5-trimethyl cyclohexanone, and methylphenyl ketone are ketones which can be used for Schiff base formation. As possible aldehydes, butyraldehyde, isobutyraldehyde, benzaldehyde, etc., are mentioned.

The preparation of the Schiff bases to be used according to the invention, which bases are known per se, takes place according to the usual method, such as has been described by Norton et al., Journal of Organic Chemistry, 19 II, 1054–1065 (1954) and by Mannich et al, Ber. dtsch. chem. Ges. 69, 2106 et seq. (1936), proceeding from the amine compounds and ketones or aldehydes.

The Schiff bases to be used according to the present invention and prepared in this manner can be used alone or in admixture with each other.

The use of the Schiff bases prepared in this manner is not limited to the monomeric form. Pre-polymeric compounds which still contain functional groups such as hydroxyl groups or amino groups can also be used, for example as are present in adducts formed between isocyanates or pre-polymeric isocyanates and the aforementioned compounds.

As linking components for the Schiff base and silane, all compounds can be used which can enter addition reactions with the reactive groups of the Schiff base and of the silane, for example components containing-NCO groups and epoxide groups. Preferably, aliphatic and cycloaliphatic isocyanates, suitably of hydrocarbons, are used for linking, for example hexamethylene diisocyanate, isophorone diisocyanate, 4,4'-diisocyanato dicyclohexyl methane, pre-polymeric isocyanates which can contain groups as urethane or biuret groups, and aliphatic or aromatic glycidyl compounds such as ethyleneglycol diglycidyl ether, dicarboxylic acid diglycidyl esters, and diphenol diglycidyl ether.

Epoxides which are derived from bis-phenols such as diphenylol propane (Bisphenol A), diphenylol methane (Bisphenol F), and phenol-formaldehyde condensation products (novolaks), as well as those derived from aromatic dicarboxylic acids and polycarboxylic acids, such as the phthalic acids, are named as preferred epoxy compounds, for example.

The ratio of Schiff base and silane to the linking component is advantageously so chosen that one-half equivalent of Schiff base and of silane are present for each equivalent of linking agent, although deviations naturally are possible. The amount of material expressed in equivalents pertains in each case to the mutually-reactive groups of the individual components.

If the silanes contain functional groups which can react directly with the amine groups of the Schiff bases, for example silanes containing glycidyl groups, the use of a linking compound is not necessary. In this case, the silanes and the Schiff bases are reacted with each other directly in equivalent amounts.

Also in case the silanes contain amino groups, the linking compounds can be dispensed with and the amino groups can be reacted directly to form a Schiff base. However, in case it is desired, these silanes can also be reacted with the Schiff bases by means of a linking compound.

The adhesion improvers according to the present invention can be added alone or in admixture in amounts from 0.05 percent to 5 percent, particularly from 0.5 to 1.5 percent, by weight of the plastisol formulation. Mixtures with conventional adhesion improvers which are inert to the adhesion improvers according to the present invention are also suitable for modification for use in the case of normal, for example metallic, substrate materials. For the so-called "difficult-to-bond" materials, one must reckon with a decrease in the adhesion values, independent of the mixing ratios which may be employed.

If, instead of the preferred reaction products which contain azomethine groups and silane groups, the also-possible physical mixtures of azomethine compounds and amino-silane compounds are added, the mixing ratio is variable within wide limits. That is, an optimum compromise can be struck between the practical requirements from the point of view of strength of the bond on the one hand and the economical aspects on the other.

Preferably, mixtures of Schiff bases and aminosilanes in ratios from 10:90 to 90:10 by weight, particularly 25:75 to 75:25 by weight, are used.

The effect of the adhesion improver according to the present invention is dependent, on the one hand, on its nature and amount in any given plastisol formulation as well as the nature of a particular substrate. On the other hand, the composition of the plastisol formulation is not without influence. That is, the efficacy of the adhesion improver must in each case be tested in view of the multiplicity of components in the various plastisol formulations (PVC, plasticizer, extender, filler, stabilizer).

Because of the large breadth of variation of the components of the plastisol formulations, the mixing ratio for the adhesion improver according to the invention in order to optimize it for any given plastisol formulation is as a rule easily determined with a few orientation tests.

The adhesion improvers according to the present invention can—according to practical demand—be used in combination with commercially-available adhesion improvers. When these adhesion improvers according to the state of the art are employed, it is to be noted that a more or less greater decrease in the bond strength can occur depending on the plastisol formulation and the substrate, as well as on the type and amount of the commercial adhesion improver employed.

When using mixtures of amino-silanes and Schiff bases according to the present invention, aliphatic, cycloaliphatic, and araliphatic monoamines, preferably amines of hydrocarbons, such as aminoheptane, 2-ethylhexylamine, 3,3,5-trimethylcyclohexyl amine, benzyl amine, and 3-diethylamino-propylamine, can be reacted, as well as the aforementioned polyamino components, with the aforementioned ketones or aldehydes for preparation of the Schiff base.

A better understanding of the present invention and its many advantages will be had by referring to the following specific Examples, given by way of illustration.

Preparation of the Adhesion Improver (A) An adduct is prepared from isophorone diisocyante, γ-mercaptopropyl trimethoxy silane, and a Schiff base (prepared from diethylene triamine and methylisobutyl ketone) in a mol ratio of 1:1:1.

44.4 g of isophorone diisocyanate
39.2 g of γ-mercaptopropyl trimethoxy silane, and
0.01 g of tin-II-octoate are combined, warmed to 95° C., and maintained at this temperature for about five hours. The adduct so obtained is added dropwise to 54 g of ketimine (prepared from diethylene triamine and methylisobutyl ketone), heated to about 95° C., during the course of about 2½ hours. The reaction product is post-reacted for about another two hours and then diluted with "Shellsol A" to form a 70 percent solution. The product has an amine number of 101.

(B) An adduct is prepared from bisphenol-A-diglycidyl ether, γ-mercaptopropyl trimethoxy silane, and a Schiff base (prepared from diethylene triamine and methylisobutyl ketone) in a mol ratio of 1:1:1.

63 g of bisphenol-A-diglycidyl ether
45 g of ketimine (prepared from diethylene triamine and methylisobutyl ketone), and
33 g of γ-mercaptopropyl trimethoxy silane are combined and stirred for six hours at a maximum temperature of 25° C. Subsequently, they are permitted to react for a further four hours at about 60° C. A viscous product having an amine number of 197 is obtained. The viscosity is reduced by the addition of 30 percent of "Shellsol A".

(C) A Schiff base is prepared from γ-aminopropyl triethoxy silane and methylisobutyl ketone.

74 g of γ-aminopropyl triethoxy silane
100 g of methylisobutyl ketone, and
50 g of molecular sieve (3A)

are combined and heated under reflux for about 10 hours, whereupon the maximum interior temperature reaches 122° C. After cooling, the material is filtered off from the molecular sieve (remaining finely-divided molecular sieve is separated by centrifugation). In a water-jet vacuum, the excess ketone is distilled off at a maximum temperature of 145° C. A product having an amine number of 189 is obtained.

(D) An adduct is formed from γ-glycidoxypropyl trimethoxy silane and a Schiff base prepared from diethylene triamine and methylisobutyl ketone. 95 g of glycidoxypropyl-trimethoxy silane are added to 109 g of ketimine, heated at 110° C.–120° C., over a period of one hour. The material is post-reacted for about eight hours at 120° C. and a product having an amine number of 329 is obtained.

(E) An adduct is formed from bisphenol-A-diglycidyl ether, γ-mercaptopropyl trimethoxy silane, and A Schiff base (formed from diethylene triamine and methylisobutyl ketone) in a mol ratio of 1:0.75:0.75.

77 g of bisphenol-A-diglycidyl ether,
29.4 g of γ-mercaptopropyl trimethoxy silane, and
40.2 g of ketimine are combined and treated as in (B) above. The viscosity is reduced by the addition of 30 percent of xylene.

(F) A mixture is made of γ-aminopropyl triethoxy silane and of a Schiff base (prepared from 1 mol of isophorone diisocyanate and the ketimine formed between 2 mols of diethylene triamine and methylisobutyl ketone).

75 Parts by weight of the reaction product of 1 mol of isophorone diisocyanate and 2 mols of diethylene-triamine/methylisobutyl ketone-ketimine are mixed with 25 parts by weight of γ-aminopropyl triethoxy silane.

(G) A mixture is made of a commercial triamino silane having an amine number of 625 ("Triamino", Dynamit Nobel) and a Schiff base (prepared from one mol of isophorone diisocyanate and two mols of a ketimine formed from a diethylene triamine and methylisobutyl ketone).

75 Parts by weight of the reaction product of 1 mol of isophorone diisocyanate and two mols of diethylene triamine/methylisobutyl ketone-ketimine are mixed with 25 parts by weight of triamino silane.

(H) A Schiff base, prepared from isophorone diamine and excess isobutyraldehyde according to U.S. Pat. No. 3,932,357 and having an amine number of 402, is mixed with the triamino silane mentioned in (G) in a weight ratio of 75:25.

(I) A polyaminoimidazoline (amine number=400), prepared from a polymerized tall oil fatty acid (having a content of 71 percent of dimeric, 17 percent of tri- and higher-polymeric, and 12 percent of monomeric tall oil fatty acid) and triethylene tetramine is reacted in a conventional fashion with excess methylisobutyl ketone to form the corresponding Schiff base having an amine number of 323 and is then mixed in a weight ratio of 75:25 with the triamino silane mentioned under (G) above.

(J) A Schiff base prepared according to conventional methods from benzyl amine and excess methylisobutyl ketone (amine number=283) is mixed in a weight ratio of 75:25 with the triamino silane mentioned in (G) above.

(K) A mixture of two Schiff bases and two silane compounds is prepared comprising:
25 parts by weight of γ-aminopropyl-triethoxy silane 25 parts by weight of triamino-silane (amine number 625, commercially available from the Dynamit Nobel Company)
25 parts by weight of a Schiff base formed from diethylene triamine and methylisobutyl ketone and
25 parts by weight of the reaction product of 1 mol of isophorone diisocyanate and 2 mols of a Schiff base formed from diethylene triamine and methylisobutyl ketone.

(L) A mixture of one Schiff base and two silane compounds is prepared comprising:
50 parts by weight of a Schiff base from diethylene triamine and methylisobutyl ketone,
25 parts by weight of γ-aminopropyl triethoxysilane, and 25 parts by weight of triamino silane (amine number 625, commercially available from the Dynamit Nobel Company).

(M) In each case, 0.5 mol of the following compounds is added onto 1.0 mol of isophorone diisocyanate;
(a) γ-mercaptopropyl-triethoxy-silane,
(b) γ-aminopropyl-triethoxy-silane
(c) a Schiff base formed from diethylenetriamine and methylisobutyl ketone, and
(d) a Schiff base formed from dipropylene triamine and methylisobutyl ketone.

(N) In each case, 0.66 mol of the following compounds is reacted with one mol of isophorone diisocyanate:
(a) γ-mercapto-trimethoxy-silane,
(b) γ-aminopropyl-triethoxy-silane, and
(c) the Schiff base formed from diethylene triamine and methylisobutyl ketone.

COMPARATIVE EXAMPLES (O) Reaction product of 1 mol of isophorone diisocyanate and 2 mols of diethylene triamine/methylisobutyl ketone-ketimine,
(P) γ-aminopropyl triethoxy silane
(Q) Triamino silane ("Triamino")
(R) γ-mercaptopropyl trimethoxy silane
(S) A mixture of (O) and (R) in a ratio of 1:1.

EXAMPLES OF THE METHOD ACCORDING TO THE INVENTION OR OF THE INVENTIVE USE OF THE ADHESION IMPROVER

The adhesion improvers according to the invention, as well as the adhesion improvers employed for comparison purposes, were tested in the following typical plastisol formulations.

| Plastisol Formulation I | Plastisol Formulation II |
| --- | --- |
| 22.3 pbw of a pastable PVC containing an emulsifier and having a K-value of 70 ("Vinnol P 70") | 28.5 pbw of a pastable PVC ("Vinnol E 68 cP") |
| 27.3 pbw of phthalic acid-di-(2-ethylhexyl) ester | 28.5 pbw of phthalic acid di-(2-ethylhexyl) ester |
| 49.6 pbw of a filler mixture of 50% chalk and 50% barium sulfate | 42.7 pbw of chalk ("Calibrite") |
| 0.8 pbw of diisobutyl tin-di-(isooctyl)-thioglycolic acid ester | 0.3 pbw of diisobutyl tin-di-(isooctyl)-thioglycolic acid ester |

The plastisol was prepared in a manner known per se from the polyvinyl chloride by intimate mixing of the plasticizer, fillers, and the stabilizer. Thereafter, the adhesion improvers or adhesion improver mixtures were added with stirring (in amounts according to the following Table) in order to obtain the finished plastisol.

The bonding strengths of the bonds attainable with the plastisols according to the present invention are determined following DIN 53283.

For this, aluminum sheet which has not been pre-treated, glass, plastic, and unpainted steel were used as the parts to be joined. The size of the parts was 2.5 cm×10.5 cm×0.15 cm (breadth×length×thickness).

The layer thickness of the plastisol in the adhesive joints was adjusted to 2 mm using spacer shims.

The parts to be joined were heated at 160° C. for 30 minutes and in this way adhered with an overlap of 15 mm.

A comparison of the bond strengths of the adhesion improvers A-N according to the present invention with those obtained using the adhesion improvers O-S (corresponding to the state of the art), in plastisol formulation I or II, makes clear the advantages earlier described which can be attained with the adhesion improvers according to the present invention.

| Examples According to The Invention | Plastisol Formulation | Amount of Adhesion Improver (% by weight) | Bond Strength on Aluminum Which Has Not Been Pre-treated (N/cm$^2$) |
|---|---|---|---|
| A | I | 1.0 | 365 |
| B | I | 1.0 | 397 |
| C | I | 1.0 | 251 |
| D | I | 1.0 | 289 |
| E | I | 1.0 | 353 |
| F | I | 1.0 | 316 |
|   | II | 1.0 | 312 |
| G | I | 0.5 | 338 |
|   |   | 1.0 | 387 |
|   | II | 1.0 | 225 |
| H | I | 1.0 | 343 |
| I | I | 1.0 | 341 |
| J | I | 1.0 | 338 |
| K | I | 1.0 | 325 |
| L | I | 1.0 | 327 |
| M | I | 1.0 | 341 |
| N | I | 1.0 | 351 |
| Comparison Examples |   |   |   |
| O | I | 1.0 | 42 |
| P | II | 1.0 | 196 |
| Q | II | 1.0 | 122 |
| R | I | 1.6 | 30 |
| S | I | 1.0 | 35 |

What is claimed is:

1. A method which comprises applying to a substrate material a plastisol composition comprising a polymer of vinyl chloride and then baking the composition onto the substrate material at a temperature between about 100° C. and 200° C., said plastisol composition further comprising from 0.05 to 5 percent, by weight of said plastisol composition, of an adhesion improver which is a compound or compounds having an azomethine group and a silane group and wherein, if said azomethine group and said silane group are separately present in different compounds, then said compound having a silane group is an aminosilane.

2. A method as in claim 1 wherein at least one compound having an azomethine group is present together with at least one aminosilane in a weight ratio between 10:90 and 90:10.

3. A method as in claim 1 wherein said adhesion improver is at least one compound having both an azomethine group and a silane group.

4. A method as in claim 3 wherein the compound having an azomethine group and a silane group is a Schiff base of an aminosilane.

5. A method as in claim 3, wherein the compound having an azomethine group and a silane group is a compound prepared by linking a Schiff base and a silane, each having a further reactive group therein, with a linking compound having a plurality of linking groups reactive with said further reactive groups of said Schiff base and said silane.

6. A method as in claim 1 wherein said substrate is metallic.

7. A method as in claim 6 wherein said metallic substrate is aluminum which has not been pretreated.

8. A plastisol composition comprising a polymer of vinyl chloride together with an adhesion improver which is a compound or compounds having an azomethine group and a silane group and wherein, if said azomethine group and said silane group are separately present in different compounds, then said compound having a silane group is an aminosilane.

9. A plastisol composition as in claim 8 wherein at least one compound having an azomethine group is present together with at least one aminosilane in a weight ratio between 10:90 and 90:10.

10. A plastisol composition as in claim 8 wherein said adhesion improver is at least one compound having both an azomethine group and a silane group.

11. A plastisol composition as in claim 10 wherein the compound having an azomethine group and a silane group is a Schiff base of an aminosilane.

12. A plastisol composition as in claim 8 wherein the compound having an azomethine group and a silane group is a compound prepared by linking a Schiff base and a silane, each having a further reactive group therein, with a linking compound having a plurality of linking groups reactive with said further reactive groups of said Schiff base and said silane.

* * * * *